June 17, 1924.                  E J. SMITH                  1,497,800
                                 FLYTRAP
                            Filed Feb. 20, 1922
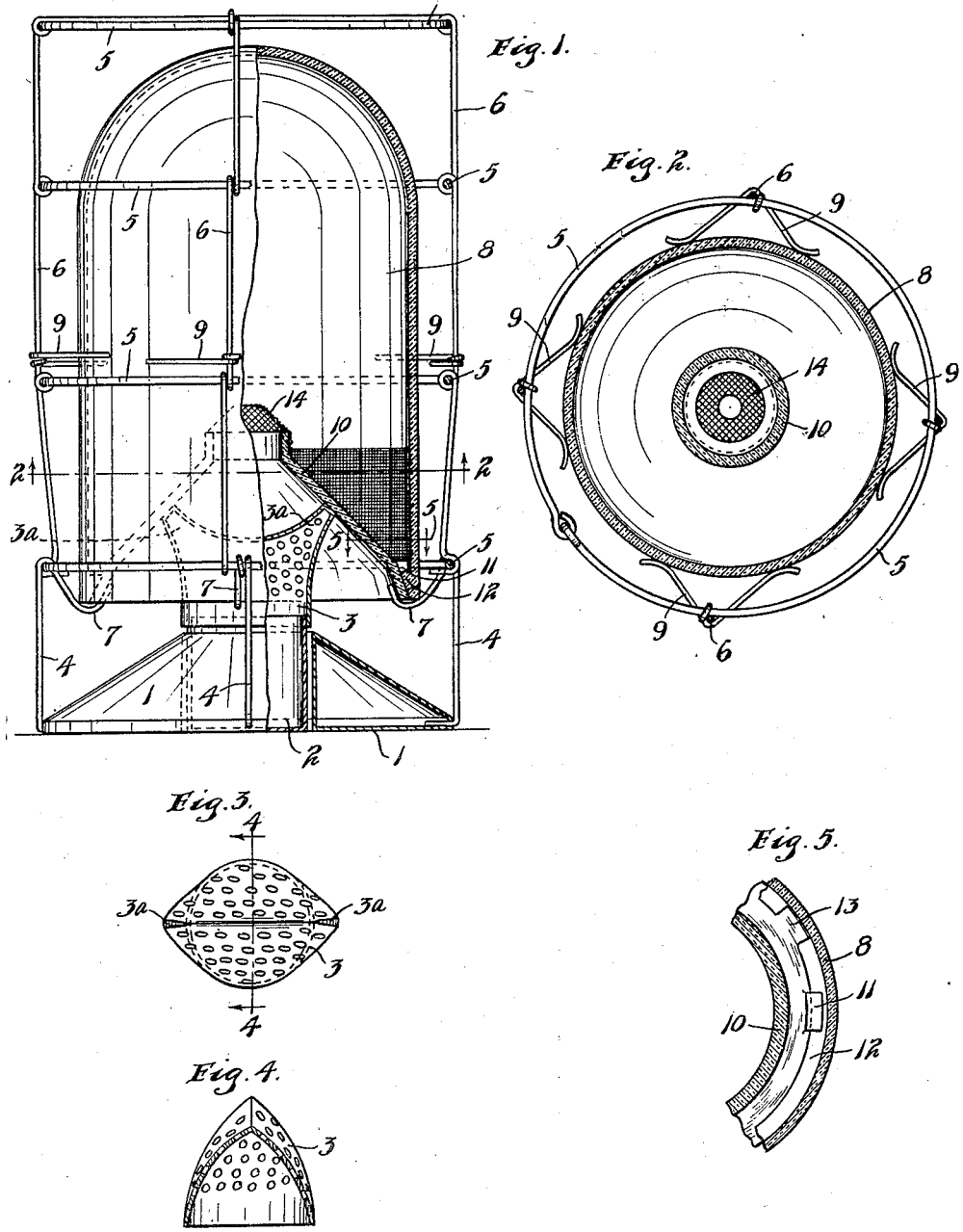
INVENTOR.
E J. SMITH.
BY HIS ATTORNEY.
James F. Williamson

Patented June 17, 1924.

UNITED STATES PATENT OFFICE.

E JOHN SMITH, OF MURDO, SOUTH DAKOTA.

FLYTRAP.

Application filed February 20, 1922. Serial No. 537,815.

*To all whom it may concern:*

Be it known that I, E JOHN SMITH, a citizen of the United States, residing at Murdo, in the county of Jones and State of South Dakota, have invented certain new and useful Improvements in Flytraps; and I do hereby declare the following to be a full, clear, and exact description of the invention, such as will enable others skilled in the art to which it appertains to make and use the same.

This invention relates to a fly trap particularly designed to trap common house flies and similar insects.

It is an object of this invention to provide a trap having a closed bait receptacle so that the flies are attracted by the bait but do not reach the same.

It is a further object of the invention to provide a trap having a transparent or closed trap receptacle which will be made so as to be able to contain hot water, and in which the flies may be scalded after having accumulated therein.

It is a further object to provide a sanitary trap of simple and efficient construction adapted to rest upon an ordinary flat surface.

These and other objects and advantages of the invention will be fully set forth in the following description made in connection with the accompanying drawings in which like reference characters refer to the same parts throughout the different views, and in which Fig. 1 is a view in front elevation of the device, a part of the same being shown in section;

Fig. 2 is a horizontal section taken on the line 2—2 of Fig. 1, as indicated by the arrows;

Fig. 3 is a top plan view of a portion of the trap;

Fig. 4 is a vertical section taken on the line 4—4 of Fig. 3; and

Fig. 5 is a horizontal section taken on the line 5—5 of Fig. 1.

Referring to the drawings, the device comprises a conical member 1 which serves as a base to support the trap and also serves as an approach member up which the flies crawl. This member has a central aperture in which is disposed a bait receptacle 2 which can, as will be readily seen, be removed through the bottom of member 1. The member 2 is closed at its upper end and surrounded by a member 3 which fits over its upper edge. This member 3 has a cylindrical base but is flattened at its upper edge and formed bicuspidate, so as to have two upwardly extending parts or cuspids $3^a$. The member 3 is perforated, as shown, so that the odor of the bait will pass therethrough.

A wire frame enclosing vertical members 4 is provided which will be connected in any suitable manner to the bottom of the base 1 so as to be readily detachable therefrom. As illustrated, the members 4 are formed of spaced vertical wires or rods having their ends inturned and received in apertures adjacent the bottom of the base 1. These vertical members can, of course, be attached by any suitable and readily detachable means. The frame also comprises vertically spaced horizontal rings 5, the lower of which is supported in the top of the members 4 which are bent around to hold the same, and these rings are connected by vertically spaced wires or rods 6 which are bent around the lowermost ring and successively about the rings thereabove. A plurality of circumferentially spaced hook members 7 project inwardly and downwardly from the lower ring 5 and form a support for a transparent glass trap receptacle 7 shown as of cylindrical form having a semi-spherical top. This receptacle is held firmly in place by resilient clips 9 of suitable number secured to the vertical wires or rods 6 and having their ends in contact with the sides of the receptacle 8 and spaced circumferentially there-around. The lower end of the receptacle 8 is closed by a conical member 10 which will also be made of transparent glass. This member is tightly fitted into the receptacle 8 and is provided with projecting lugs 11 adjacent its bottom portion which will normally be supported on a ledge 12 formed by an inwardly projecting portion at the bottom of the receptacle 8. Said ledge is provided with spaced slots 13, so that the member 10 may be rotated to bring the lugs 11 into registration with said slots and can then be withdrawn from the receptacle 8. The member 10 is formed at its top with a cylindrical portion surmounted by a cone 14 which will be made of metal screen, preferably of copper or other non-corrosive metal. This member 14 is provided at its top with a small central aperture, as shown in Fig. 2. The bottom surface of the member 10 is placed in position to connect with the top of the divisions or cusps $3^a$ of the member 3. The receptacle 8 will, preferably, be painted or otherwise blackened for a short distance from its bottom, as indicated in Fig. 1.

In operation, the bait will be placed in the vessel 2. The odor of this bait will pass out through the perforate member 3 and the flies will be attracted thereby and will crawl up the inclined surface on the top of base member 1 and from thence, onto the outer surface of the member 3. The flies will then continue to move over the surface of the member 3 and can crawl therefrom onto the under surface of the conical member 10. Owing to the darkening of the lower portion of the vessel 8, the inner side of this cone will be comparatively dark and the flies will tend to crawl up to the light spot above formed by the opening through the center of the screen 14. The flies will pass through this opening, then into the trap receptacle 8. As is well known, a fly will not readily find the opening through which he enters and will not crawl directly downward through a small central opening, such as formed in the member 14. The flies will thus be trapped in the receptacle 8 and will accummulate therein. When it is desired to get rid of the flies trapped, the frame will be disconnected from the base 1 and the receptacle 8, together with its bottom member 10, can be readily removed. Hot water can then be poured into the vessel 8 through the screen 14 or the same can be readily submerged in hot water so that the flies will be instantly killed. The same can then be readily removed by removing the member 10, as above described, and the parts of the device can thus be kept clean and sanitary.

From the above description it is seen that applicant has provided a simple and efficient fly trap. The parts will all be made of non-corrosive material and can, as stated, be readily cleaned and kept in a sanitary condition. The parts are few and can be readily and inexpensively made. The trap can be disposed in any desired place and is readily transported.

It will, of course, be understood that various changes may be made in the form, details and arrangement of the parts without departing from the scope of applicant's invention, which generally stated, consists in the matter shown and described and set forth in the appended claims.

What is claimed is:

1. A fly trap having in combination a base member forming an approach member for the flies, a bait holding receptacle disposed in said base member, an upwardly extending perforated member surrounding and closing the top of the bait receptacle, an imperforate trap receptacle having a concave bottom disposed over said perforated member with its bottom in contact therewith, and a conical perforate member having a small aperture at its top in the center of said bottom.

2. The structure set forth in claim 1, said concave bottom serving as a guide to said trap and also as a container for all dirt in said trap and an open work frame protectively encasing and supporting said trap receptacle.

3. A fly trap having in combination a base member containing a bait-receiving vessel, a perforate member closing the upper end of the bait receptacle and extending upwardly therefrom, an imperforate transparent trap receptacle having a concave bottom therein disposed over said perforate member with the lower surface of said bottom in contact therewith, said bottom being provided at its upper and central portion with a conical screen having a small central aperture therethrough.

4. A fly trap having in combination a bait receptacle, an upwardly inclined perforated member surrounding and closing the top of the same, said member being outwardly of convex bicuspidate form and a trap receptacle supported above said member having its bottom surface touching the tops of the cusps thereof.

5. A fly trap comprising a closed cylindrical trap receptacle having a closed top and a glass conical member extending upwardly at the bottom thereof forming a closure for said receptacle and having a metal perforated tip with a small aperture therein at its central portion.

6. The structure set forth in claim 5, said conical member being supported by said receptacle and readily removable therefrom.

7. A fly trap having in combination a closed bait receptacle, a perforated bicuspidate member surounding the top of the receptacle.

8. A fly trap having in combination a bait receptacle, a perforated member fitting over the top thereof and having a substantially flattened perforated portion extending thereabove, a trap receptacle having a hollow conical imperforate bottom disposed above and contacting said member at spaced points, whereby the flies can crawl from said member onto the inner face of said conical bottom, the latter having a small opening through the top thereof leading into said trap receptacle.

In testimony whereof I affix my signature.

E JOHN SMITH.